United States Patent
Faiga

(10) Patent No.: US 12,377,387 B2
(45) Date of Patent: Aug. 5, 2025

(54) FILTERING AND SEPARATING DEVICE FOR LIQUID MIXTURES UNDER PRESSURE BY MEANS OF MEMBRANES

(71) Applicant: R.T.S. ROCHEM Technical Services GmbH, Hamburg (DE)

(72) Inventor: Ralf Faiga, Hamburg (DE)

(73) Assignee: R.T.S. ROCHEM TECHNICAL SERVICES GMBH, Hamburg (DE)

( * ) Notice: Subject to any disclaimer, the term of this patent is extended or adjusted under 35 U.S.C. 154(b) by 0 days.

(21) Appl. No.: 15/931,363

(22) Filed: May 13, 2020

(65) Prior Publication Data

US 2020/0391160 A1  Dec. 17, 2020

(51) Int. Cl.
| | |
|---|---|
| *B01D 63/08* | (2006.01) |
| *B01D 35/30* | (2006.01) |
| *B01D 39/16* | (2006.01) |
| *B01D 39/20* | (2006.01) |
| *B01D 61/02* | (2006.01) |
| *B01D 63/10* | (2006.01) |

(52) U.S. Cl.
CPC ........... *B01D 63/084* (2013.01); *B01D 35/30* (2013.01); *B01D 39/1607* (2013.01); *B01D 39/2082* (2013.01); *B01D 61/025* (2013.01); *B01D 63/107* (2022.08); *B01D 2239/02* (2013.01); *B01D 2313/04* (2013.01); *B01D 2313/201* (2022.08); *B01D 2325/40* (2013.01)

(58) Field of Classification Search
CPC .. B01D 63/084; B01D 35/30; B01D 39/1607; B01D 61/025; B01D 2239/02; B01D 2313/04; B01D 2325/40; B01D 2313/20; B01D 2313/21; B01D 39/2082; B01D 63/10; B01D 65/00
See application file for complete search history.

(56) References Cited

U.S. PATENT DOCUMENTS

| 6,224,767 B1 | 5/2001 | Fujiwara et al. |
| 2010/0140161 A1 | 6/2010 | Haynes et al. |

(Continued)

FOREIGN PATENT DOCUMENTS

| DE | 202008014306 U1 * | 2/2009 | .......... B01D 63/082 |
| EP | 3437724 A1 | 2/2019 | |

(Continued)

OTHER PUBLICATIONS

Fruetsche, Bernhard "Simple pressure housing for membrane modules (plate and winding module) for pressures > 80 bar" DE 202008014306 U1 (Year: 2009).*

(Continued)

*Primary Examiner* — Dirk R Bass
(74) *Attorney, Agent, or Firm* — BACON & THOMAS, PLLC

(57) ABSTRACT

A device for filtering and separating pressurized liquid mixtures by means of a membrane includes a substantially pressure-tight container in which the membranes are accommodated in a pressure-tight manner. The container has at least one intake for the mixture, as well as at least one outlet for the permeate separated from the mixture by means of the membranes, and at least one outlet for the retentate, also referred to as a concentrate. The pressure-tight container is made of plastic.

16 Claims, 4 Drawing Sheets

(56) References Cited

U.S. PATENT DOCUMENTS

| | | | |
|---|---|---|---|
| 2011/0192781 A1* | 8/2011 | Stolarik | B29C 70/78 |
| | | | 210/232 |
| 2011/0233126 A1* | 9/2011 | Prouty | B01D 61/10 |
| | | | 210/232 |
| 2016/0038881 A1* | 2/2016 | Yang | B01D 63/106 |
| | | | 210/236 |

FOREIGN PATENT DOCUMENTS

| | | |
|---|---|---|
| JP | H11159619 A | 6/1999 |
| WO | 02/45828 A1 | 6/2002 |

OTHER PUBLICATIONS

International Preliminary Report on Patentability in corresponding PCT Application No. PCT/EP2020/000093, dated May 17, 2021.

* cited by examiner

FILTERING AND SEPARATING DEVICE FOR LIQUID MIXTURES UNDER PRESSURE BY MEANS OF MEMBRANES

FIELD OF THE INVENTION

The invention relates to a device for filtering and separating liquid mixtures using a membrane, comprised of a pressure-tight container in which the membrane is received in a pressure-tight manner, as well as at least one intake for the mixture and at least one outlet for the permeate separated from the mixture by the membrane, and at least one outlet for the retentate.

BACKGROUND OF THE INVENTION

A device of this type is known from EP-A-3 437 724. This document is merely one example of the existing comprehensive prior art in the field of devices for filtering and separating pressurized liquid mixtures with a membrane. These devices are used in all fields in which liquid mixtures, i.e. liquids composed of numerous components or substances, or gaseous mixtures, need to be separated into their components. These devices are used, e.g. for removing salt from saltwater, i.e. where it is necessary to generate drinking water from saltwater. These devices are also used for separating so-called seepage water and separation thereof into its components, if this seepage water escapes into landfills, for example, and can readily contaminate the environment, because components of the seepage water are hazardous to health or even toxic. Lastly, these devices are also used in industry to clean and separate process water obtained in the production of chemical products, which can likewise pollute the environment or communal wastewater systems. Nearly all liquid mixtures, such as those specified above, can be separated or filtered with these membrane-supported methods, wherein different membrane-based separation methods, e.g. nanofiltration, ultrafiltration, and reverse osmosis, or mixtures thereof, can be used, depending on the nature of the liquid mixtures that are to be separated, depending on the liquid mixture that is to be separated and the associated configuration of the membranes that are used.

All of these separating methods using the device according to the invention have in common that the transportation of the liquid mixtures that are to be separated must take place via or through the membrane at very high pressures, e.g. in a range exceeding 120 bar. Consequently, the device must be robust enough that it can withstand these pressures during the conveyance of the liquid mixture that is to be separated by the device, or the membrane, because a loss of pressure while the device is operating will lead to a complete failure of the device. Without possibilities for quick repairs, e.g. on marine facilities, or with devices that are difficult to access, this can have fatal consequences, such that it is of primary importance that the ongoing operational safety of the container for the device is ensured, in that the membrane, regardless of the type of membrane (coiled membranes or flat membranes) remains pressure-tight when it is exposed to these extremely high mixture and feed pressures.

For these reasons, previous containers have been made out of relatively thick-walled, tempered steel, the specific weight of which is known to be very high, wherein the steel also ensures that the container cannot become chemically corroded by the components of the mixture, thus ensuring ongoing protection against corrosion. In addition to the weight, the tempered steel used so far for the containers is very expensive, and also very expensive to work with.

In industrial or commercial facilities, installations are necessary with the device according to the invention, which have numerous devices that are installed in ships or exploration platforms in the ocean, resulting in extremely high masses or extremely high weights due to the materials the containers are made of, e.g. tempered steel, not to mention the high costs for the materials associated therewith.

SUMMARY OF THE INVENTION

The object of the present invention is to create a device that can be produced much less expensively, and is much lighter than previously, while still ensuring the same level of operational safety, wherein the operational safety is not compromised in relation to the prior art, and the absolute pressure-tightness of the container is ensured at extremely high operating pressures of more than 120 bar.

This object is achieved according to the invention in that the pressure-tight container is made of a plastic.

Experts in this field have maintained, on the basis of theoretical models and calculations, that plastic in general cannot satisfy these very high demands for withstanding high pressures, and no attempts have been made to create the extremely pressure-resistant containers for these devices from plastics.

Making these containers from plastic, however, has the great advantage that plastic is much lighter than the previously used tempered steel (20%-30% of the weight of a container made of tempered steel), and appropriate plastic is chemically neutral in relation to the liquid mixtures that are to be separated, as is the case with tempered steel, and the production and processing costs for the plastic used in producing the pressure-tight containers are much lower than for producing pressure-tight containers made of tempered steel.

As a result, not only are the production costs reduced significantly, but this approach also opens up new fields of use for the device, because they can be made much lighter than previously, such that the use in marine facilities is also expanded substantially.

Tests and attempts to use these materials in practical applications have shown that it is extremely advantageous to use epoxy resin as the plastic, which is able to withstand extremely high pressures when it is cured, wherein, due to its wide use, and its relatively low weight, it can be produced very inexpensively and can also be processed relatively easily.

There are numerous different types epoxy resins. Of the many epoxy resins, the use of aramid [poly(1,4-phenylene terephthalamide)] for the invention has proven to be advantageous. The weight, strength and low production costs for this type of epoxy resin, i.e. its weight-to-strength ratio, processing ease, and low production costs, are particularly advantageous.

If the intention is to produce pressure-tight containers, which can withstand any high processing pressures applied to the liquid mixture, and which are as light as possible, it is very advantageous to select Kevlar (an internationally registered trademark of the company Du Pont) for the plastic used to make the pressure-tight containers. Kevlar is known to be stronger than tempered steel, for example, weighing no more than ⅕ of a comparable container made of tempered steel.

To make the pressure-tight container from plastic, it may be very advantageous to reinforce the plastic with fibers, wherein these reinforcing fibers are advantageously glass fibers, or a fiberglass, integrated in the molding of the container, and according to another advantageous embodiment, it may be useful to use carbon fiber if higher demands are placed on the strength of the plastic, wherein these carbon fibers can likewise be integrated in the plastic during production of the container, either in the form of fibers or fabrics.

According to an advantageous embodiment of the device, the plastic is made of polyvinyl chloride (PVC). Of the many different types of known plastics that are used, e.g. for pressure-tight mechanical components, polyvinyl chloride is relatively inexpensive to obtain, and also relatively easy to process mechanically. Making pressure-tight containers for the device from polyvinyl chloride is preferred, e.g. if the container does not need to withstand the highest processing pressures for the liquid mixture.

Although the pressure-tight containers can exhibit different structures, depending on the application, the container is advantageously a tube-shaped element with a substantially circular cross section, which is extremely beneficial with regard to the production of the container, because the container can be prefabricated as a container tube according to the invention, and then simply cut to the desired lengths.

According to another advantageous embodiment of the device, the intake for the mixture that is to be separated is formed in an end element on the container that can be inserted into a first open end, i.e. the intake as such is structurally independent of the actual pressure-tight container, i.e. the container does not need to be mechanically processed to provide for the intake, because the intake is formed on the first end element, independently of the container, and the first end element is placed in the interior of the container during assembly, or removed therefrom during disassembly.

For this reason it is likewise advantageous that the outlet for the permeate generated by or in the membrane element is formed on a second end element that can be received in the container at a second open end, wherein this also has the advantage that the outlet does not require any processing of the actual pressure-tight container either, i.e. it is placed in the interior of the container via the second end element, or can be removed therefrom, entirely independently of the container. Lastly, it is likewise advantageous that the outlet for the concentrated retentate formed by the membrane element that exits the device is formed on a second end element that can be received in the container at a second open end, wherein the second end element also forms the structural basis for this outlet for the retentate, as well as for the outlet for the permeate generated by the membrane element. The container as such is therefore not weakened by mechanical processing, such that it is ensured that it remains or can be kept undamaged and pressure-tight for the liquid mixture separating process.

With the known containers made of tempered steel, a continuous pressure must be applied in the axial direction, and as a consequence of the radial pressure, a sealing element had to interact with the inner wall of the container, i.e. an internal thread had to be formed at both open ends of the container, i.e. forming a type of nut in each internal end part of the container. The formation of the internal thread is extremely expensive and requires a great deal of precision. This is not the case in the present invention.

It is particularly advantageous that the first and second pressure elements are each placed on top of the first and second end elements at the respective open ends, such that they bear on the first and second end elements, respectively. These pressure elements ensure that the end elements satisfy the sealing requirements in the axial and radial directions in the interior of the container, for the interiors of those containers in which the membranes are located. The pressure elements only have to generate or ensure a suitable axial force parallel to the axis of the container, in order that the actual space in which the membrane is located in the interior of the container is hermetically sealed against the exterior, or the environment.

To ensure that the device can be installed and removed quickly and to eliminate difficult assembly and disassembly steps, it is extremely advantageous that the membrane elements that can be inserted and accommodated at both open ends of the container can be releasably secured in each case with a sealing ring, which releasably engages in a respective circumferential groove formed in the interior of the container. The advantage is that no other mechanical provisions need to be met on the container to be able to securely receive the membrane elements in the interior of the containers, and they can also be easily removed from the container for repairs and maintenance. Removal only requires an appropriate pliers or device for grasping the sealing ring that is engaged in the respective groove, and compressing it slightly, such that it can easily be removed.

In order to compensate for production tolerances in the formation of the container, and also be able to ensure a continuous axial pressure to the membrane element module, it is beneficial in another advantageous embodiment of the invention to place a disk-shaped adjustment flange between the sealing ring at the first open end of the container and the first pressure element, which applies an intended axial pressure component to the pressure element and via the end element, wherein the adjustment flange has a number of axial threaded holes parallel to the axis of the container that receive screws that can be accessed from the first open end, and wherein the screws can axially displace the end element and thus the pressure element through an axial displacement thereof, in order to maintain a sealing of the interior in which the membrane module is located that is hermetically sealed against the external environment. The screws are also used for adjustments during the assembly of the individual device components, which end up accordingly in the interior of the container.

The module comprising pressure elements on both sides and the membranes located between them must be periodically tightened in the constructions known from the prior art, with the aforementioned internal threaded nuts formed at the open ends of the container and the pressure elements, etc. at their radially outward facing threads which engage with the inner threads on the inside of the container, in order to ensure that the interior of the container remains sealed against the environment. This is extremely difficult, because the internal threads act in opposite directions, and tightening requires a great deal of effort. Using the adjustment flange according to the invention, which has numerous axial threaded holes parallel to the axis of the container, a simple axial tensioning toward the pressure element, or the module, is simplified in the container interior and can be more precisely carried out than with the constructions known from the prior art, which have internal threads at both open ends of the container.

The first and second substantially plate-shaped end elements have a circumferential groove on their radial circumferences for receiving a sealing element, wherein this sealing element basically seals the interior of the container in which the membrane elements are located in the manner of a circumferential sealing lip against the inner wall, i.e. with a suitable axial pressure, in that the sealing element extends radially outward in the groove. Advantageously, the sealing elements have a lip-shaped cross section formed from an elastomer plastic.

The device according to the invention can accommodate any suitably shaped membrane element, although it is advantageous to configure the membranes in the container in the form of a coiled membrane element, which only needs to be inserted in the interior of the container during assembly, and can be radially removed therefrom for repairs or maintenance.

With certain applications, it is also advantageous to use flat membranes, wherein in this case, the membranes are configured in the container in the form of a flat membrane unit, and wherein the flat membranes are stacked on top of one another. A typical flat membrane stack for this type of device is described in the aforementioned EP-A-3 437 724, in which the liquid mixture that is to be separated is conducted such that it meanders back and forth in its pathway from the intake to the outlet for the retentate, such that the liquid mixture passes over or through each membrane from one side to the other of a specific membrane element configuration.

The membrane elements themselves form a pillow membrane according to a preferred embodiment of the invention, regardless of whether the flat membrane unit or the coiled membrane unit is used in the container, because the coiled membranes can also form pillow membranes.

The entire unit in the interior of the device that is inserted into the container or can be removed therefrom, can be pressed together as a whole, preferably by a tensioning bolt, wherein a tensioning bolt also preferably passes axially through the membrane unit itself, such that the tensioning bolt, the membrane unit, the end elements, the pressure elements, and the adjustment flange form a unit, which can be configured to be completely functional outside the container.

Lastly, the tensioning bolt can be designed such that the permeate exiting the membranes is conducted through the tensioning bolt to the permeate outlet, which has the advantage that no further constructive provisions need to be met to collect and remove the permeate flow from the membrane elements, if the tensioning bolt has axial grooves, for example, distributed over its circumference, through which the permeate flowing from the membrane elements can be collected and conducted out of the device.

BRIEF DESCRIPTION OF THE DRAWINGS

The invention shall now be described in greater detail in reference to the following schematic drawings and based on exemplary embodiments.

Therein.

DETAILED DESCRIPTION OF THE INVENTION

Figure 1:
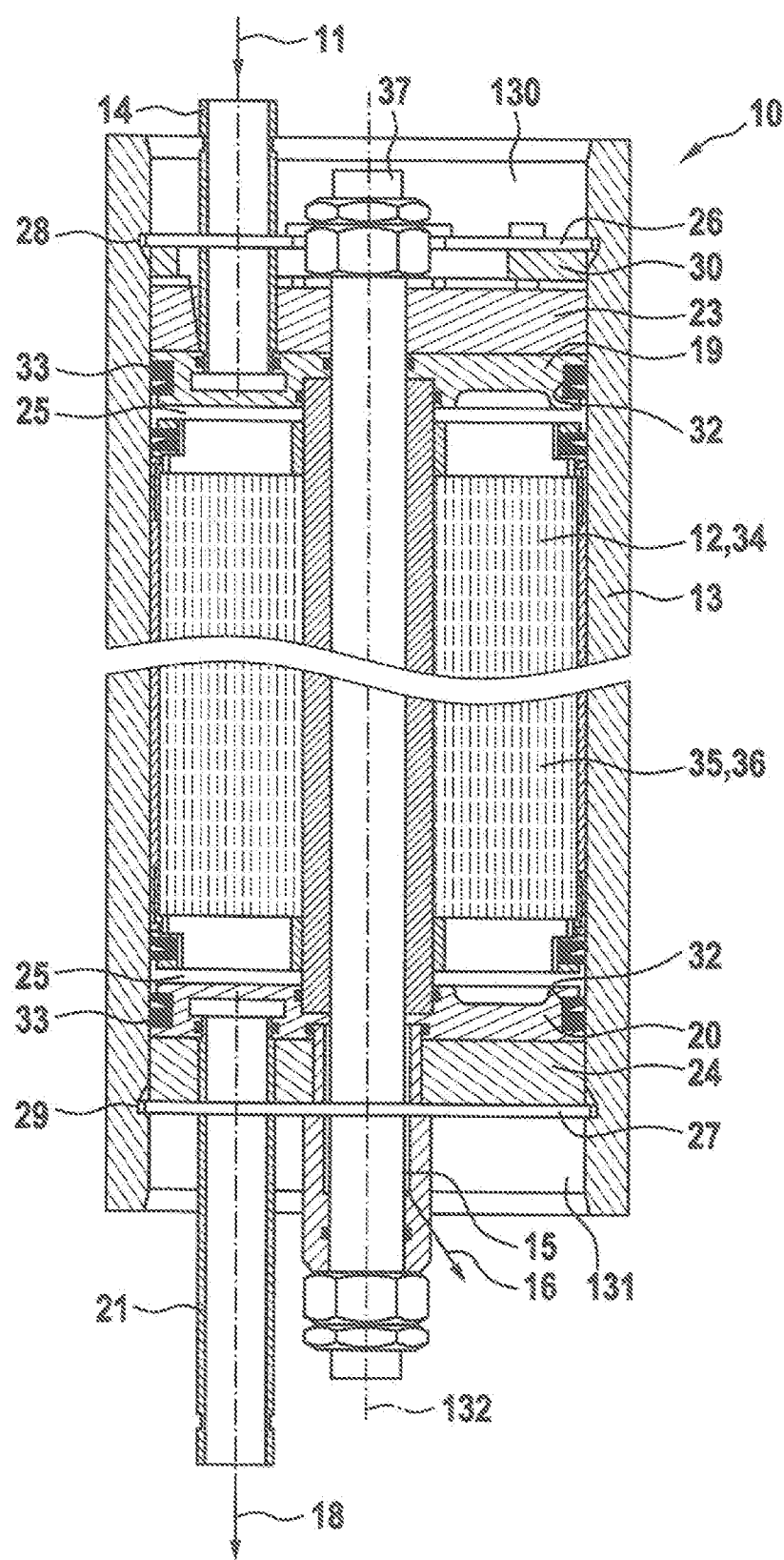
FIG. 1 shows a sectional view of a device in which the membranes are arranged in the form of a coiled membrane unit.

Reference is first made to FIG. 1, which shows a sectional view of the device 10. It should first be noted that devices 10 of this type are known per se in the prior art, i.e. in terms of their fundamental construction, such that there is no need to go into specific details with regard to the description of the device 10. These devices 10 are used for filtering and separating liquid mixtures, wherein these liquid mixtures can be liquid or gaseous mixtures. The separation of the mixture 11 is obtained inside the device 10 by means of membranes 12, wherein these membranes 12 are polymer membranes known per se in the prior art, which are configured, e.g. for nanofiltration, ultrafiltration, or reverse osmosis.

Figure 4:
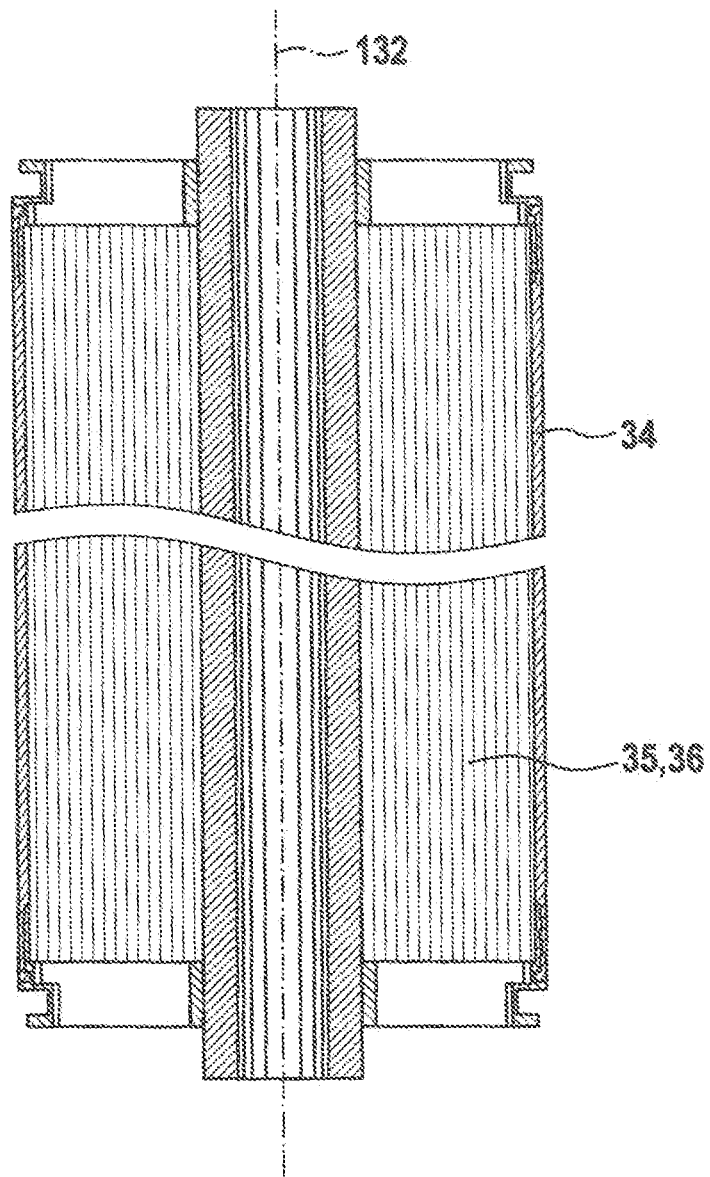
FIG. 4 shows a section of an actual coil membrane unit, as it can be placed in a container.
Figure 5:
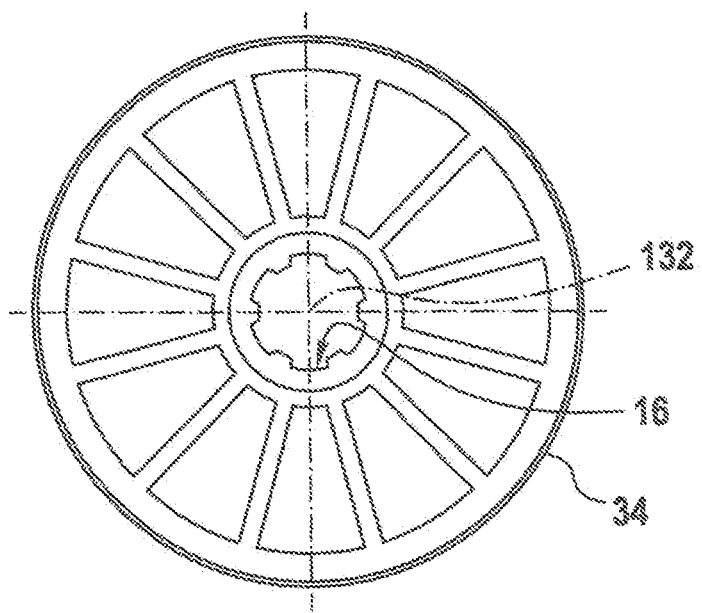
FIG. 5 shows a view from above (end surface) of the coil membrane unit from FIG. 4.

The membranes 12 are received in a container 13, configured as a coiled membrane unit 34, as illustrated, e.g., in FIGS. 4 and 5. The device 10 can also be configured such that a flat membrane unit 35 can be accommodated therein. The flat membranes 35 are stacked on top of one another, such that the liquid mixture 11 that is to be separated normally passes over the stacked membranes 12 in a meandering pathway, and exits the device 10 at the end of the stack as a retentate 18, also referred to as a concentrate.

When a coiled membrane unit 34 is used in the container 13, the mixture 11 that is to be separated is conveyed in parallel, axially through the entire coil of the membrane, without internal deflection over the entire coiled membrane, wherein all of the retentate 18 also exits the coiled membrane unit 34 axially here, and is conducted out of the device 10.

The container 13 in which the coiled membrane unit 34, or the flat membrane unit 35 is inserted axially at a first open end 13 in the course of assembly is pressure-tight, such that, e.g. it can withstand internal pressures in the interior 25 of the container 13 of more than 120 bar, by means of which the pressurized liquid mixture 11 is introduced via an intake. These high operating pressures continuously act on the interior 25 of the container 13 during an intended operation of the device 10, wherein the liquid mixtures 11 introduced therein are conducted by means of this pressure over the membrane element 12. The retentate 18 is removed from the container 13 via an outlet 21.

The container forms a tube-shaped element, and has a substantially circular cross section, wherein the circular cross section provides the container 13 with a good radial stability.

Although in theory all of the known membrane structures are suitable for use in the device 10 according to the invention, so-called pillow membranes are used for the membrane elements 12, i.e. pillow membranes are used for both the embodiment of the coiled membrane unit and the embodiment of the flat membrane unit, i.e. for the individual pillow membranes used therein. The pillow membranes characteristically have a discharge opening, through which the permeate generated and collected in the pillow is discharged, which is the case with both the membrane in the form of a coiled membrane unit as well as for the pillow membranes in a flat membrane unit.

In the embodiment of the device 10 according to FIG. 1, the permeate 16 is collected in the middle, and conveyed to an outlet 15, the permeate outlet, wherein the permeate 18 is then discharged from the device 10 for further use.

Specific to the device 10 illustrated herein is that the intake for the mixture 11 that is to be separated is formed on a first end element 19 at the top of the container, that can be received therein at a first open end 130, wherein the outlet 14 for the permeate generated by or in the membrane elements 12 is formed on a second end element 20 that can be received in the container 13 at a second opening 131. The outlet 22 for the membrane element 12, and thus for the retentate 18 exiting the device 13 is likewise formed on a second end element 20 that can be received in the container 13 at a second open end 131.

The actual sealing pressure of the two end elements in the axial direction, parallel to an imaginary axis 132 passing through the container 13, which also forms the axis for the membrane unit 34, 35, or the tensioning bolt 37 passing axially through the container 13, is formed by first and second pressure elements 23, 24, wherein the two pressure elements 23, 24 are placed on top of the first and second end elements 19, 20 at the respective open ends 130, 131, such that they bear on the first and second end elements 19, 20, respectively.

The module comprising the coiled membrane unit 34 or flat membrane unit 35 composed of membrane elements is secured in the interior 25 of the container by means of a respective sealing ring 26, 27, after this module is inserted into the interior 25 through one of the open ends 130, 131 of the container 13, including the respective end and pressure elements, which can be releasably secured in the interior 25 in a respective circumferential groove 28, 29 formed in the interior 25 of the container 13. In a simple manner, the module comprised of pressure elements, end elements, and the membrane units, regardless of which type of membrane units are used, is releasably secured in the interior 25 of the container 13 by the sealing rings 26, 27.

A disk-shaped adjustment flange 30 is located between the sealing ring 26 at the first open end according to the illustration in FIG. 1 of the container 13, and the first pressure element 23. The adjustment flange 30 has numerous axial threaded holes 31 parallel to the axis 132 of the container 13, in which corresponding adjustment screws engage. As a result, the pressure elements 23, 24 and thus the first and second end elements 19, 20 can be slightly displaced axially by turning the adjustment screws, such that the axial force applied to the second end element 20 and the second pressure element 24 through the axial displacement of the screws is ensured by a central axial tube in the coiled membrane unit 34, or by an analogous central, axial tube element if a flat membrane unit 35 is used.

Figure 2:
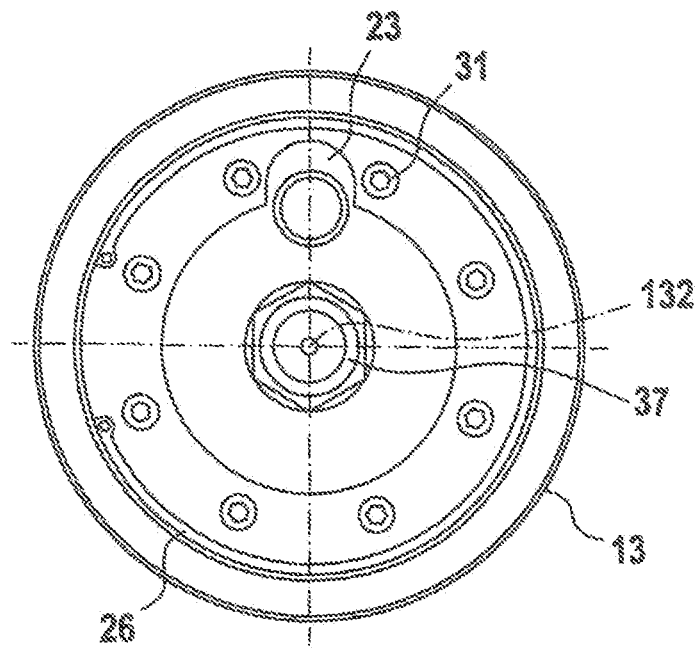
FIG. 2 shows a top view of the first open end of the container, with a sealing ring in place, as well as an adjusting flange.
Figure 3:
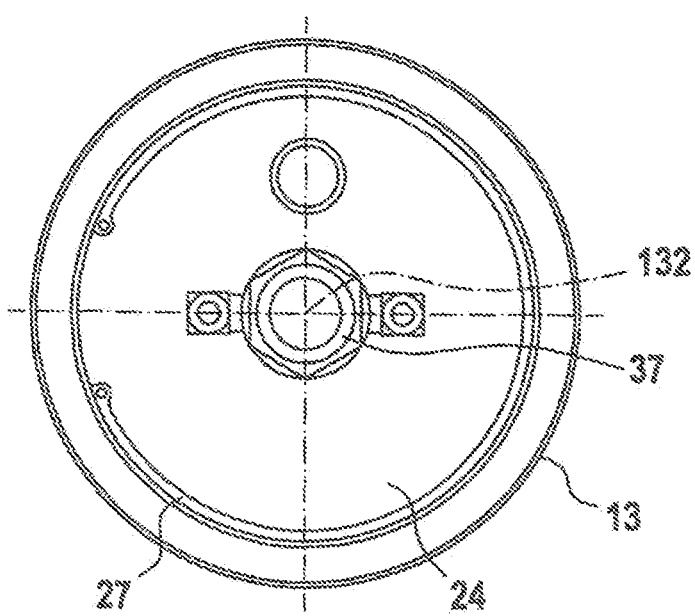
FIG. 3 shows a top view of the other, second open end of the container, with a sealing ring placed therein.

The adjustment element 31 bears on the first circumferential groove 28 in the interior of the container 13. This is the upper or lower groove 28, 29 in FIGS. 2 and 3, respectively, which show the first open end 130 in FIG. 2, and the second open end 131 in FIG. 3.

Figure 6:
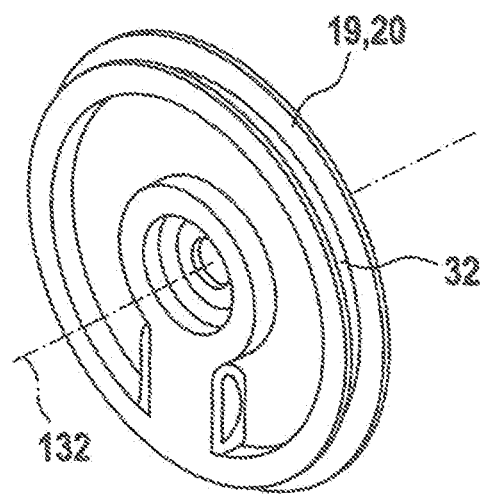
FIG. 6 shows a perspective illustration of the first, or second, end element.

The end elements 19, 20, cf. the perspective illustration in FIG. 6, which are substantially plate-shaped, each have a groove 32 that encompasses their respective radial circumference, wherein this groove 32 accommodates a respective sealing element 33, cf. FIG. 1. The sealing elements 33 have a sealing lip cross section, although the sealing elements can also have other cross sections. The tensioning bolt 27 passing axially through the center of coiled membrane unit 34, or the flat membrane unit 35, analogously, can have axial grooves, not shown herein, through which the permeate 16 collected in the middle is conducted out of the device 10. In the illustrations of the coiled membrane unit 34 in FIGS. 4 and 5, the grooves themselves are formed in the central tensioning tube in the coiled membrane unit 34, such that the tensioning bolt 37 in this embodiment of the device 10 can have a smooth surface, without any circumferential grooves. The flow of the permeate 16 is indicated symbolically by the arrow in FIG. 1.

LIST OF REFERENCE SYMBOLS 10 device
11 liquid mixture
12 membrane/membrane element
13 container
130 first open end
131 second open end
132 container axis
14 intake
15 outlet
16 permeate
18 retentate (concentrate)
19 first end element
20 second end element
21 outlet (retentate outlet)
23 first pressure element
24 second pressure element
25 interior (container)
26 sealing ring
27 sealing ring
28 inner circumferential groove (first)
29 inner circumferential groove (second)
30 adjustment flange
31 threaded hole
32 groove
33 sealing element
34 coiled membrane unit
35 flat membrane unit
36 membrane stack
37 tensioning bolt

The invention claimed is:

1. A device for filtering and separating a pressurized liquid mixture by means of membranes, the device comprising a pressure-tight container in which the membranes are received in a pressure-tight manner, and at least one intake for the mixture, wherein the pressurized liquid mixture is introduced into the container via the intake, wherein the container is hermetically sealed against the exterior, as well as at least one outlet for a permeate separated from the mixture by means of the membranes, and at least one outlet for a retentate, wherein the retentate is removed from the container via the outlet for the retentate, wherein the pressure-tight container is made of a plastic;

wherein a first end element and a second end element are received in the container through a first open end and a second open end, respectively, wherein the intake for the mixture that is to be separated is formed on the first end element and wherein the outlet for the retentate conducted through membrane elements and exiting the device is formed on the second end element, wherein a module of the membranes that is inserted and received in the interior of the container is releasably secured at both open ends of the container with a retaining ring, which releasably engages in a respective circumferential groove formed on the circumference of the interior of the container, wherein a disk-shaped adjustment flange is located between the retaining ring at the first open end of the container and a first pressure element, wherein the first pressure element is placed on top of the first end element at the first open end, such that it bears on the first end element, wherein the adjustment flange has numerous axial threaded holes parallel to an axis of the container;

wherein each of the threaded holes in the flange is provided with an adjustment screw arranged to axially displace the first pressure element by axially turning the adjustment screw such that the screws axially displace the end element and thus the pressure element through an axial displacement thereof, in order to maintain a sealing of the interior, wherein the end elements satisfy sealing requirements in the axial and radial direction in the interior of the container.

2. The device according to claim 1, wherein the plastic is composed of epoxy resin.

3. The device according to claim 1, wherein the plastic is composed of aramid [poly (1,4-phelene terephthalamide)].

4. The device according to claim 1, wherein the plastic is reinforced by fibers.

5. The device according to claim 4, wherein the reinforcement fibers are composed of glass fibers.

6. The device according to claim 4, wherein the reinforcement fibers are composed of carbon fibers.

7. The device according to claim 1, wherein the plastic is composed of polyvinyl chloride (PVC).

8. The device according to claim 1, wherein the container forms a tube-shaped element with a substantially circular cross section.

9. The device according to claim 1, wherein the outlet for the permeate generated by or in the membrane elements is formed on the second end element.

10. The device according to claim 9, wherein multiple modules comprised of membrane elements that can be inserted and received in an interior of the container can each be releasably secured at both open ends of the container with a sealing ring, which releasably engages in a respective circumferential groove formed on a circumference of the interior of the container.

11. The device according to claim 9, wherein the first and second end elements each is substantially plate-shaped and has a groove encompassing its radial circumferences for receiving a sealing element.

12. The device according to claim 1, wherein the membranes are configured in the container in the form of a coiled membrane unit.

13. The device according to claim 1, wherein the membranes are configured in the container in the form of a flat membrane unit, wherein the flat membranes are stacked on top of one another to form a stack.

14. The device according to claim 1, wherein the membranes form a pillow membrane.

15. The device according to claim 12, wherein a tensioning bolt passes axially through the membrane unit.

16. The device according to claim 15, wherein the permeate exiting the membranes is conveyed to the permeate outlet through the tensioning bolt.

* * * * *